(12) United States Patent
Wasco

(10) Patent No.: US 9,021,667 B2
(45) Date of Patent: May 5, 2015

(54) CLIP

(71) Applicant: Julie Wasco, Bloomfield Hills, MI (US)

(72) Inventor: Julie Wasco, Bloomfield Hills, MI (US)

( * ) Notice: Subject to any disclaimer, the term of this patent is extended or adjusted under 35 U.S.C. 154(b) by 0 days.

(21) Appl. No.: 13/750,785

(22) Filed: Jan. 25, 2013

(65) Prior Publication Data

US 2014/0208548 A1    Jul. 31, 2014

(51) Int. Cl.
  *A47C 7/62*    (2006.01)
  *F16B 2/20*    (2006.01)

(52) U.S. Cl.
  CPC .............. *F16B 2/20* (2013.01); *Y10T 24/44026* (2015.01); *A47C 7/62* (2013.01)

(58) Field of Classification Search
  CPC ........ A47C 7/383; A47C 21/022; A47C 7/62; D06F 55/00; A47G 21/167; F16B 5/0635; F16B 5/0664; F16B 2/20; Y10T 24/44026; Y10T 24/44017; Y10T 24/4406
  USPC ................... 24/460, 462, 457, 545, 546, 910, 24/DIG. 50, 336, 563, 556, 346, 3.1, 3.12; 248/316.7, 230.7, 340, 311.2, 228.7, 248/231.81, 215; 220/495.1; 297/397, 399, 297/220
  See application file for complete search history.

(56) References Cited

U.S. PATENT DOCUMENTS

| | | | |
|---|---|---|---|
| 679,542 A * | 7/1901 | Peats ................................ | 24/346 |
| 723,454 A * | 3/1903 | Foster ................................ | 24/44 |
| 2,543,336 A * | 2/1951 | Ratchford ......................... | 24/561 |
| 3,076,242 A * | 2/1963 | Priolo ............................... | 24/563 |
| 4,591,119 A * | 5/1986 | Kraus ............................ | 248/74.2 |
| 4,627,132 A * | 12/1986 | Markham ......................... | 24/169 |
| 4,858,285 A * | 8/1989 | Dala et al. ......................... | 24/555 |
| 4,974,764 A * | 12/1990 | Cantwell ......................... | 224/269 |
| 4,993,126 A * | 2/1991 | Collins ............................ | 24/336 |
| 5,555,607 A * | 9/1996 | Parveris ....................... | 24/129 R |
| 5,829,832 A * | 11/1998 | Molee et al. .................... | 297/397 |
| 6,477,744 B1 * | 11/2002 | Miles .............................. | 24/3.12 |
| 2001/0022014 A1* | 9/2001 | Smith .............................. | 24/546 |
| 2004/0093702 A1* | 5/2004 | Mallicoat ......................... | 24/546 |
| 2005/0060850 A1* | 3/2005 | Auriemma ........................ | 24/545 |
| 2005/0223525 A1* | 10/2005 | Wartian et al. ................. | 24/3.12 |
| 2006/0162136 A1* | 7/2006 | Silva et al. ...................... | 24/545 |
| 2008/0164381 A1* | 7/2008 | Fleischman .................. | 248/74.2 |

* cited by examiner

*Primary Examiner* — Victor Batson
*Assistant Examiner* — Abigail Morrell
(74) *Attorney, Agent, or Firm* — Fishman Stewart Yamaguchi PLLC

(57) ABSTRACT

A clip comprising a first wall member and a second wall member is disclosed. A cross-section of the first wall member is defined by a first side wall, a second side wall and a connecting wall that is positioned between the first side wall and the second side wall. A cross-section of the second wall member is defined by a first end and a second end, wherein at least a portion of the first end is connected to a portion of the first side wall of the first wall member and wherein a second end is positioned between the first side wall and the second side wall and spaced away from an inner surface of the connecting wall. The first wall member and the second wall member cooperate to define a channel having a first portion and a second portion.

19 Claims, 3 Drawing Sheets

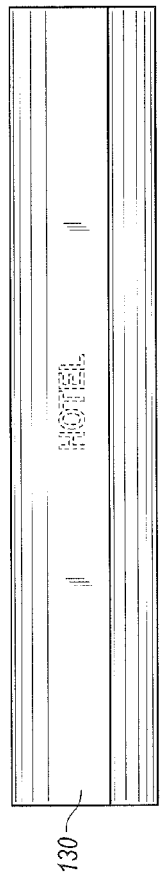
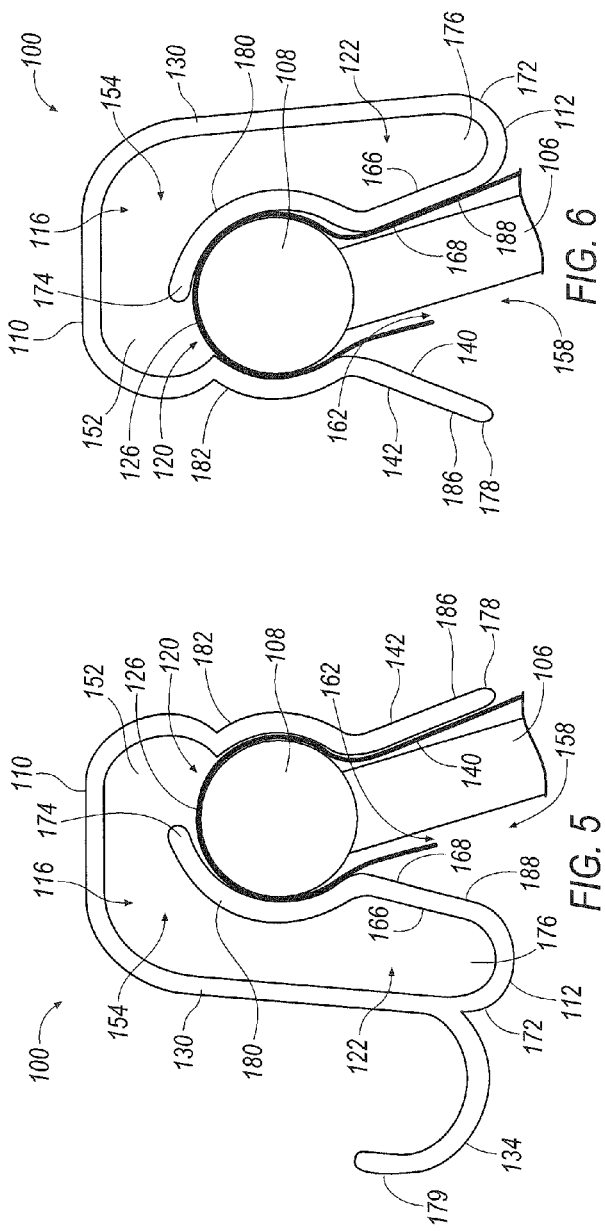

CLIP

TECHNICAL FIELD

The present disclosure relates to clips, in particular, clips that can be attached to beach chairs or lounges and may be used to assist in holding or retaining towels, blankets or other items in place on such chairs or lounges.

BACKGROUND

Beach chairs, deck chairs, and lounge chairs are often used at beaches, around pools, at resorts and on cruise ships and other places where people gather to sit in the sun. Those who sit in such chairs may find that their skin sticks to the sitting surface. In addition, the chair users may also get patterns from the chair surfaces on their skin, which may be aesthetically unpleasant when they get up from the chair. After the chairs sit in the sun for some time, the surfaces of the chairs may also get uncomfortably hot. And those who temporarily leave the chair may want the chair to still be available for them when they return.

For the above described reasons and others, those who sit in the chairs often spread a towel or blanket on the chair prior to sitting on it. This helps users avoid getting lines from the chair on exposed skin, the potential discomfort of sitting in a hot chair, and it identifies the user's chair if the user leaves the chair to return later. But placing a towel on a chair may create other problems for users. For example, the wind can blow towels off the chair, or can blow corners of the towel into the faces of users sitting in a chair. Users sitting on the towels may find that the towel bunches up or slides away from its intended position, in particular, coming down from the top of the chair, requiring users to repeatedly reposition the towel.

While there are different clips available to hold beach towels in place on beach chairs and lounge chairs, such known clips are designed to be used in pairs, with one clip to be attached to each of the top corners of the beach towel, securing it to the chair. Some of these clips are not compatible with the cross-sectional shapes of the chairs and may not open wide enough to fit over the chair frame. Other known clips may allow the towel to slip out of a grip portion of the clip or be difficult to position on the chair frame.

BRIEF SUMMARY

A selectively releasable clip is disclosed for use in holding towels, blankets or other items to beach chairs, deck chairs, lounges, and other support structures. In one exemplary arrangement, the clip comprises a first wall member and a second wall member. A cross-section of the first wall member is defined by a first side wall, a second side wall and a connecting wall that is positioned between the first side wall and the second side wall. A cross-section of the second wall member is defined by a first end and a second end, wherein at least a portion of the first end is connected to a portion of the first side wall of the first wall member and wherein a second end is positioned between the first side wall and the second side wall and spaced away from an inner surface of the connecting wall. The first wall member and the second wall member cooperate to define a channel having a first portion and a second portion. The second portion of the channel is configured to selectively receive a portion of second wall member as second wall member flexes to accommodate an edge of chair within the first channel portion such that the clip frictionally grips the chair.

In one exemplary use of the clip, an edge of a towel, blanket or other item may be positioned adjacent to an edge of the chair. The clip is arranged over the edge of the chair and moved toward the edge such that the edge of the chair (and the edge of the towel, blanket or other item) will be directed through an opening into the first channel portion. The second wall member, which is biased toward the first channel is forced to flex into the second channel portion to accommodate the thickness of the chair edge and the edge of the blanket, towel, or other item. However the second portion is configured to engage the edge of the chair and push the edge of the chair into frictional engagement with an inner surface of the first wall member, thereby trapping and retaining the blanket, towel, or other item between the chair edge and the inner surface of the first wall member. In this manner, the blanket, towel, other item (such as signage), may be secured to the chair.

BRIEF DESCRIPTION OF THE DRAWINGS

FIG. 4 is a rear elevational view of the clip of FIG. 1;

FIG. 5 is an end view of the exemplary clip of FIG. 1 installed on a chair in a first configuration and retaining an end of a towel;

FIG. 6 is an end view of an exemplary clip installed on a chair in a second configuration and retaining an end of a towel.

DETAILED DESCRIPTION

Figure 1:
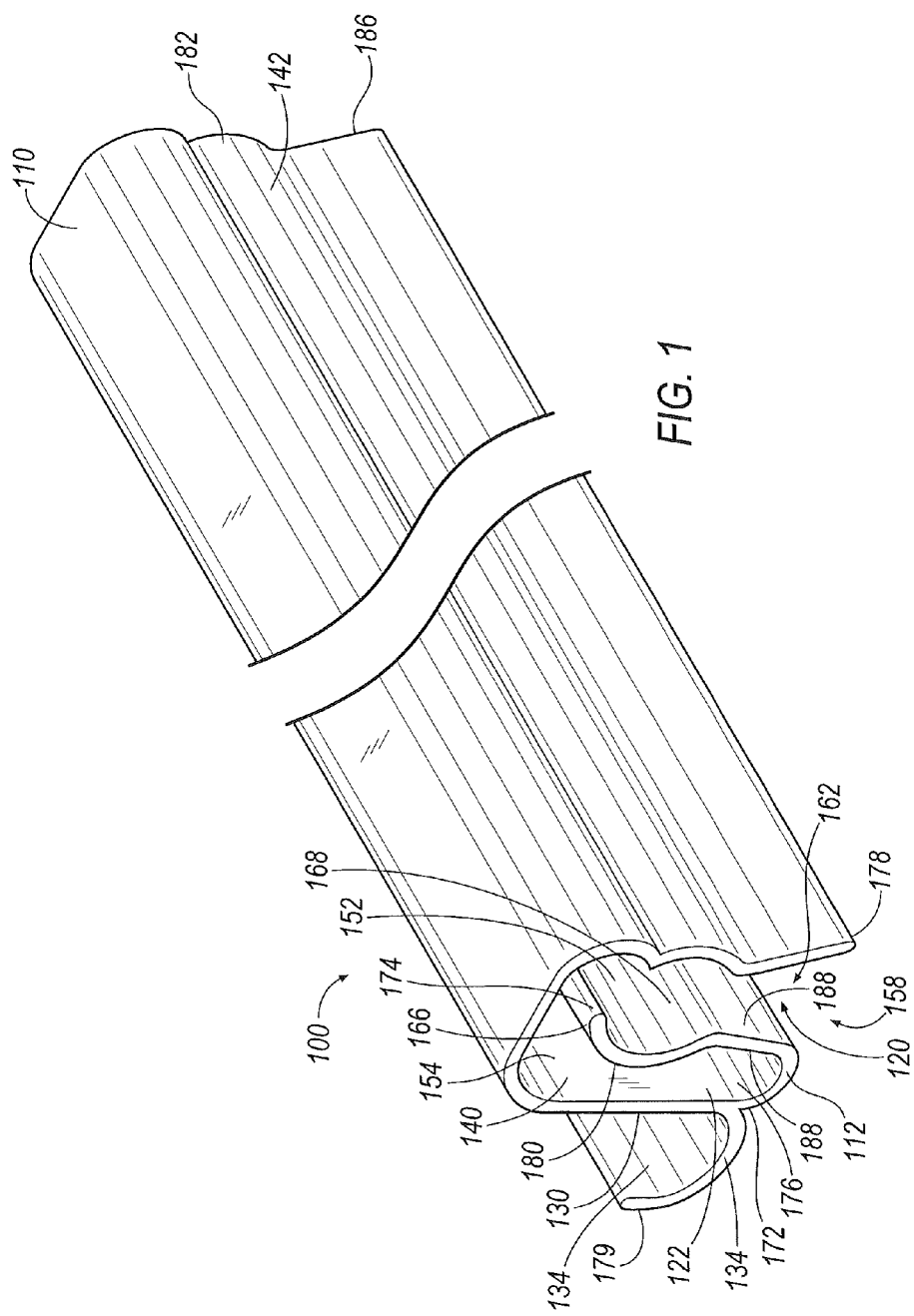
FIG. 1 is a perspective view of an exemplary clip.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

A clip is disclosed that may be selectively secured to a portion of a frame of a beach chair, deck chair, lounge chair or other supporting structure. In one exemplary arrangement, the clip comprises a first wall member and a second wall member that cooperate to define a channel. The channel may have two portions: a first portion that allows the clip to be secured to a frame of a beach chair or to another supporting structure, and a second portion that configured to selectively receive a portion of second wall member as second wall member flexes to accommodate an edge of chair within the first channel portion. A portion of the first wall member of the clip may have a generally planar surface suitable for displaying printed information. An optional hook which may be used to hold bags or other belongings may extend from first wall member of clip, and may extend along the length of clip.

Referring to FIGS. 1-5, an exemplary clip 100 is illustrated. While describe in the context of a clip, it is understood that clip 100 may be used with blankets and other fabric or flexible materials, such as signs.

Figure 2:
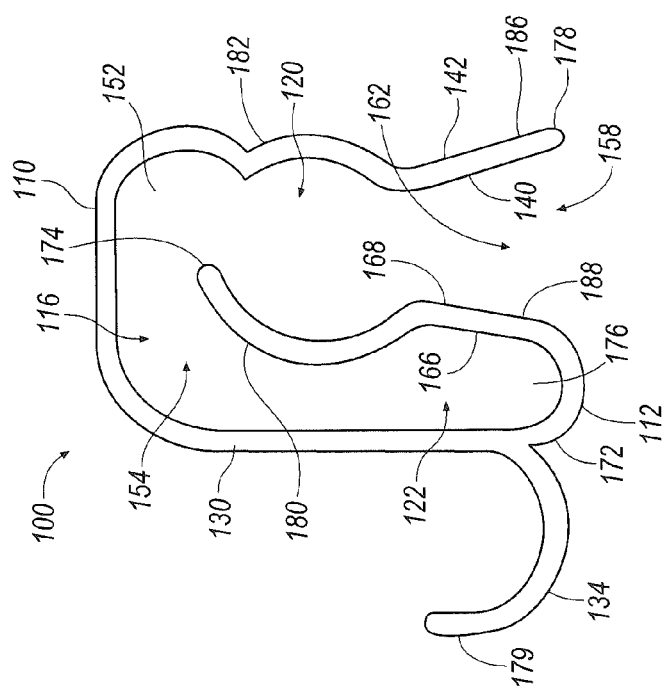
FIG. 2 is an end view of the clip of FIG. 1.

As best seen in FIGS. 1-2, clip 100 includes a first wall member 110 and a second wall member 112. First wall member 110 is defined by an inner surface 140 and an outer surface 142. Inner surface 140 of first wall member 110 cooperates with second wall member 112 to define a channel 116 that, in one exemplary arrangement, may extend longitudinally through the length of clip 100. As best seen in FIG. 2, channel 116 may be generally U-shaped so as to define a first portion 120 and a second portion 122, with each side of the "U" defining one of the portions 120, 122, and the portions being separated by second wall member 112.

Each portion 120, 122 of channel 116 has a first end and a second end. Second end 152 of first portion 120 is connected to first end 154 of second portion 122 at the base of U-shaped channel 116. Channel 116 has an opening 158 defined between first wall member 110 and second wall member 112. Opening 158 is positioned in a first end 162 of first portion 120 of channel 116, as best seen in FIG. 2.

Figure 3:
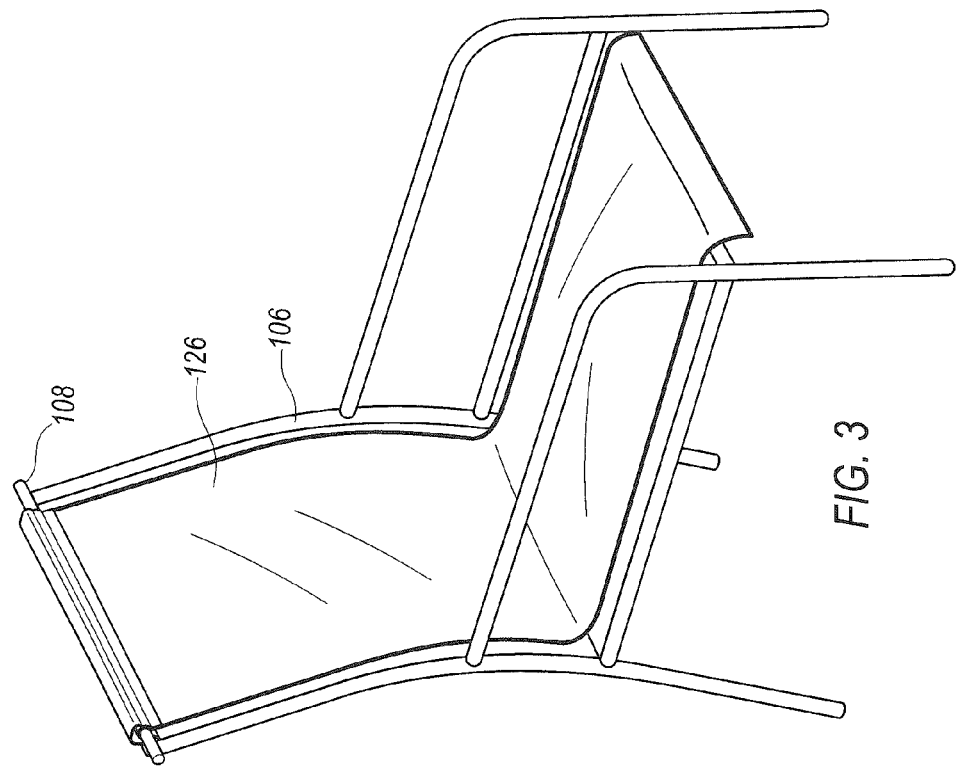
FIG. 3 is a perspective view of the exemplary clip of FIG. 1 installed on a chair in a first configuration.

Second wall member 112 has a first surface 166 and a second surface 168. First portion 120 of channel 116 is defined by inner surface 140 of first wall member 110 and second surface 168 of second wall member 112. Second portion 122 of channel 116 is defined between inner surface 140 of first wall member 110 and first surface 166 of second wall member 112. First portion 120 of channel 116 is configured to attach clip 100 to a chair frame 106 or other support structure, while second portion 122 of channel 116 is configured to retain an end of a towel 126 within clip 100. Once a towel 126 has been retained within clip 100, clip may be attached to a chair frame 106 or other support structure, as shown in FIGS. 3 and 5, and is configured to hold towel 126 in place.

Second wall member 112 has a first end 172 and a second end 174. First end 172 of second wall member 112 is attached to first wall member 110 to close second portion 122 at second end 176 of second portion 122 of channel 116. In one exemplary arrangement, second portion 122 is closed along the length of clip 100. However, it is understood that second portion 122 need not be closed along the entire length.

Second wall member 112 may include a contoured portion that is generally configured to conform to a section of frame 106 of a chair, or other supporting structure. For example, in one exemplary configuration, second wall member 112 may include a radial portion 180 that is configured to generally conform to a radial section of a tubular portion of frame 106 of a beach chair, lounge chair, deck chair or other similarly proportioned supporting structure 108. In such an embodiment, the arc of radial portion 180 of second wall member 112 extends into second portion 122 of channel 116. The portion of first wall member 110 that defines first portion 120 of channel 116 may also be provided with a radial section 182 that is also configured to generally conform to a radial section of a tubular portion of frame 106 of a beach chair, lounge chair, deck chair or other similarly proportioned supporting structure 108. Radial section 182 of first wall member 110 may cooperate with radial section 180 of second wall member 112 to secure clip 100 to a tubular portion of a chair frame 106 or other support structure positioned between radial section of first wall member 110 and radial section of second wall member 112. It is contemplated that other contours configured to conform to the sectional shape of various chairs may be used in place of radial portion 180 and radial section 182. For example, complementary rectangular shapes, oval shapes, square shapes, etc. may also be employed, depending on design or shape of the chair frame to which the clip is to attach.

Both first wall member 110 and second wall member 112 may have a generally planar portion 186, 188 extending from radial portions 180, 182. When in place on the back of a tubular chair frame 106 or similar support structure, generally planar portions 186, 188 may extend generally downward from the respective radial portion 182, 180 and are configured to extend below tubular chair frame 106, when clip 100 is installed. Generally planar portion 186 of first wall member 110 may extend from radial portion 182 of first wall member to the first end 178 of first wall member. Generally straight portions 186, 188 may also be configured to angle away from one another in such a way that opening 158 of first portion 120 of channel 116 is wider an engagement section above opening 158, to facilitate engagement of clip 100 on a beach chair or other supporting structure 108.

Clip 100 may be provided with rounded corners and rounded exterior edges along the length of clip 100 as such rounded exterior edges also allow users to rest their heads, shoulders, or other body parts against clip 100 without discomfort.

First wall member 110 may also be provided with a second end 179 that extends beyond first end 172 of second wall member 112. Second end 179 of first wall member 110 may be integrally foamed with first wall member 110 and configured as a hook 134. In one exemplary arrangement, hook 134 is configured to extend substantially the length of clip 100 or may extend for only a portion of the distance along the length of clip 100. In another alternative arrangement, a series of hooks 134 may be formed to extend from outer surface 142 of first wall member 110. Hooks 134 may be configured to hold handles of bags, signage or other containers, thus keeping bags or containers near the user and convenient to the user, but not in the user's way.

Now referring to FIG. 5, insertion of towel 126 into clip 100 will now be explained. A towel, blanket, signage or other item may first be positioned with an edge adjacent to an edge of a chair 106. Using a towel for example, an edge 176 of a towel 126 may be positioned to extend slightly over a top edge 108 of a chair 106. Clip 100 may next be press-fit over top of an edge of chair 106. For example, referring to FIG. 5, clip 100 may be positioned over a top edge of a chair 106 and moved downwardly such that the edge of the chair 106, with the towel disposed thereon, is received within opening 158. The installation of clip 100 on chair 108 or other supporting structure is made by exerting axial pressure on clip 100 once the penetration of the chair frame 108 and towel 126 into opening 158 is initiated. The attachment of clip 100 to chair 106 takes place through the application of pressure between clip 100 and chair frame 108, causing outward deflection of first wall member 110, as well as overcoming a biasing force of the second wall member 112 as clip 100 slides along the chair frame 108. Second wall member 112 is flexed partially into second channel portion 122. Clip 100 can then be pushed onto chair frame 106 until engagement portions of first wall member 110 and second wall member 112 are selectively secured to the chair frame 106 or other support member. As may be seen, second wall member 112 is biased toward first portion 120 and toward inner surface 140 of first wall member 110. Thus, when clip 100 is in place on a chair or other supporting structure 108, second wall member 112 is biased toward first portion 120 of channel 116, thereby cooperating with first wall member 110 to frictionally retain the end of towel 126 to chair 106. Indeed, the end of the towel becomes trapped; at least between frame 108 and inner surface 140 of first wall member 110 and may also be trapped between frame 108 and second surface 168 of second wall member 112. While described as being connected to a top edge of chair 106, it is understood that clip 100 may also be attached to other portions of the chair 106, such as side edges, for example.

Clip 100 may be made of a material with sufficient resilience to allow first and second wall members 110, 112 to flex sufficiently to fit over a portion of a chair frame 108 or other support structure. Once in place on a chair frame 108 or other support structure, first wall member 110 and second wall member 112 cooperate to grip the chair frame 108 or other support structure. Once clip 100 is attached to a chair frame 108 or other support structure, second wall member 112 will be forced slightly away from first portion 120 of channel 116.

Once clip 100 has been attached to a chair frame 108 or other support structure, a free end of towel 126 is disposed away from opening 158 of clip 100 and may be laid upon a seating surface of chair 106, while the opposite end 176 is secured to chair 106. To release clip 100 from chair 106, a user can simply grasp clip 100 and pull away from chair 106 or supporting member. To facilitate removal, first end 178 of first wall member 110 may be moved outwardly to release engagement portions of first and second wall members 110, 112 from frame 108. Both towel 126 and clip 100 together may be removed in this manner.

In one exemplary arrangement, length L of clip 100 may be sufficiently long to allow towel 126 to be secured to a chair frame 108 or other support member with only one clip 100, while still securing the top of towel 126 in place on chair 108 and preventing the towel from blowing out of place. Length L of clip 100 may be sufficiently long to allow clip to prevent the top corners of towel 126 from blowing in the user's face. Clip 100 may extend substantially the entire distance along a straight portion of the back of chair frame 108. However, it is understood that other sizes of clip are also contemplated. Moreover, it is also understood that more than one clip 100 may be utilized to secure towel 126.

As shown in FIG. 4, first wall member 110 of clip 100 may be configured with at least one generally planar portion 130. In one exemplary arrangement, planar portion 130 extends longitudinally substantially along the length of clip 100. Planar portion 130 may be disposed adjacent hook 134. Generally planar portion 130 of clip 100 may be suitable for displaying text or figures, thereby allowing for the personalization of clip 100, or for the display of advertisements or other identification on clip 100. Generally planar portion 130 may be substantially vertical when clip 100 is in place on a chair frame 108, to allow text or figures to be easily seen by people facing clip 100. For example, a pool supply store could have its logo or name printed on the back (or front) of clips 100, and sell or give clips 100 to customers. Hotels could have the name of the hotel printed on the clip 100. Hotels that are on beaches could provide clips 100 on the backs of the hotel chairs. This would not only allow guests to secure their towels to the chairs, but also identify the chairs as belonging to the hotel. Hotels and cruise ships could also make clips 100 available to their guests for use on chairs near pools or in hotel rooms for bath towels to shower doors or other towel hanging devices.

Referring to FIG. 6, an alternative configuration of clip 100' is shown. Clip 100' has the same general configuration as clip 100 with the exception of hook 134. As previously noted, hook 134 is optional. Clips 100 and 100' are configured to be reversible when positioned on chair frames and other supportive members. More specifically, as best seen in FIG. 6, clip 100' may be oriented such that generally planar portion 130 is oriented toward a forward portion or seating area of the chair, as opposed to the installation configuration illustrated in FIG. 5. In this manner, text or other indicia may be visible when clip 100' is secured to a chair as the one is approaching the chair.

The operation of clip 100' will now be described in the context of FIG. 6, including use with a towel. As described above, other items may be used with clip 100', including, but not limited to, blankets, clothing items, signs or other items. As previously described, towel 126 may be positioned adjacent a top edge of a chair frame 108, and even overlapping chair frame 108. Once an edge of towel 126 is positioned in a desired location, clip 100' is press-fit over top of and onto frame 108 with substantially planar surface 130 positioned to the right. Clip 100' is press-fit so as to capture a portion of towel 126 at least between a top of frame 108 and second surface 168. Because second wall member 112 is biased away from second portion 122, second wall member 112 cooperates with first portion 110 to frictionally grip clip 100' to chair frame 108. In one exemplary arrangement, a free end of towel 126 is positioned over the top of chair frame 108 such that towel 126 is effectively trapped between a top of frame 108 in two locations, the first between second surface 168 and frame 108, as discussed above, as well as between inner surface 140 of first wall member and frame 108.

It is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A clip comprising:
   a first wall member; and
   a second wall member;
   wherein a cross-section of the first wall member is defined by a first side wall, a second side wall and a connecting wall that is positioned between the first side wall and the second side wall;
   wherein a cross-section of the second wall member is defined by a first end and a second end;
   wherein the first wall member defines a channel, and the second wall member is positioned within the channel to define a first portion of the channel and a second portion of the channel;
   wherein the second side wall of the first wall member has a radially shaped contoured portion arranged in a direction away from the second wall member;
   wherein the second wall member has a radially shaped contoured portion arranged across the first portion of the channel from the contoured portion of the second side wall and in a direction away from the second side wall such that the respective contoured portions define a receiving portion of the channel;
   wherein the first wall member and the second wall member both further define a first face and a second face at respective ends of the first wall member and the second wall member, the first face and the second face defining a length of the clip between the first face and the second face, and wherein the channel defines a height of the clip from the first end of the second wall member to the connecting wall of the first wall member, the length of the clip being greater than the height of the clip; and wherein the first side wall, the second side wall, and the connecting wall each have an exterior surface, the exterior surfaces defining an exterior of the clip, and wherein a majority of the first side wall of the first wall member is planar.

2. The clip of claim 1 wherein the second side wall of the first wall member and the second wall member cooperate to define an opening into the first portion of the channel.

3. The clip of claim 1 wherein the second portion of the channel is closed substantially along its length.

4. The clip of claim 1 further comprising a hook, wherein the hook extends outwardly from the first wall member.

5. The clip of claim 4 wherein the hook extends along substantially the length of the clip.

6. The clip of claim 1 wherein the second side wall further has a substantially planar portion that extends from the contoured portion of the second side wall.

7. The clip of claim 1 wherein the clip is constructed of resilient material.

8. The clip of claim 1 wherein the first wall member has a generally planar surface configured for displaying graphics.

9. The clip of claim 8 wherein the planar surface extends along the length of the clip.

10. The clip of claim 1 wherein the first and second wall members are integrally formed together as a unitary member.

11. The clip of claim 1 wherein the channel is a generally U-shaped channel, and wherein the second portion of the channel is closed along the length of the clip, and wherein the first portion of the channel includes an opening opposite the connecting wall of the first wall member.

12. The clip of claim 11 wherein a portion of the first wall member and a portion of the second wall member cooperate to define the opening.

13. The clip of claim 12 wherein the portions of the first wall member and the second wall member that define the opening are angled away from one another to create a flared entrance into the first portion of the channel.

14. The clip of claim 1 wherein the external surface of the clip is contoured so as to eliminate any sharp edges.

15. The clip of claim 1 wherein the second side wall of the first wall member and the second wall member each have a planar portion defining an opening into the first portion of the channel, the respective planar portions being arranged such that the first portion of the channel is tapered from the opening to the receiving portion.

16. The clip of claim 1 wherein the first wall member and the second wall member have a uniform thickness.

17. The clip of claim 1 wherein the first face and the second face have the same profile, and wherein the clip is extruded from the first face to the second face along the length of the clip.

18. A clip comprising:
a first wall member; and
a second wall member;
wherein a cross-section of the first wall member is defined by a first side wall, a second side wall and a connecting wall that is positioned between the first side wall and the second side wall;
wherein a cross-section of the second wall member is defined by a first end and a second end;
wherein the first wall member defines a channel, and the second wall member is positioned within the channel to define a first portion of the channel and a second portion of the channel;
wherein the second side wall of the first wall member has a radially shaped contoured portion arranged in a direction away from the second wall member;
wherein the second wall member has a radially shaped contoured portion arranged across the first portion of the channel from the contoured portion of the second side wall and in a direction away from the second side wall such that the respective contoured portions define a receiving portion of the channel;
wherein the first wall member and the second wall member both further define a first face and a second face at respective ends of the first wall member and the second wall member, the first face and the second face defining a length of the clip between the first face and the second face, and wherein the channel defines a height of the clip from the first end of the second wall member to the connecting wall of the first wall member, the length of the clip being greater than the height of the clip; and
wherein the first wall member and the second wall member have a uniform thickness.

19. The clip of claim 18 wherein the first wall member and the second wall member have a uniform thickness throughout the entire length of the clip.

\* \* \* \* \*